US010487908B2

(12) United States Patent
Mototsune (10) Patent No.: US 10,487,908 B2
(45) Date of Patent: Nov. 26, 2019

(54) LOCK-UP DEVICE FOR TORQUE CONVERTER

(71) Applicant: EXEDY Corporation, Neyagawa-shi, Osaka (JP)

(72) Inventor: Ken Mototsune, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 245 days.

(21) Appl. No.: 15/542,146

(22) PCT Filed: Nov. 20, 2015

(86) PCT No.: PCT/JP2015/082697
§ 371 (c)(1),
(2) Date: Jul. 7, 2017

(87) PCT Pub. No.: WO2016/117219
PCT Pub. Date: Jul. 28, 2016

(65) Prior Publication Data
US 2018/0266515 A1    Sep. 20, 2018

(30) Foreign Application Priority Data

Jan. 19, 2015    (JP) .................................. 2015-007593

(51) Int. Cl.
*F16F 15/123*    (2006.01)
*F16H 45/02*    (2006.01)

(52) U.S. Cl.
CPC ....... *F16F 15/12366* (2013.01); *F16H 45/02* (2013.01); *F16H 2045/0231* (2013.01); *F16H 2045/0278* (2013.01)

(58) Field of Classification Search
CPC ................ F16F 15/12366; F16H 45/02; F16H 2045/0205; F16H 2045/0278; F16H 2045/0231
(Continued)

(56) References Cited

U.S. PATENT DOCUMENTS 3,138,011 A        6/1964  Stromberg
4,138,003 A *      2/1979  Malloy ..................... F16D 3/66
                                                          192/213.2
(Continued)

FOREIGN PATENT DOCUMENTS

BE            642290 A       5/1964
CN         103124865 A       5/2013
(Continued)

OTHER PUBLICATIONS

First Office Action of the corresponding Chinese patent application No. 201580072380.2, dated Nov. 26, 2018, 5 pp.
(Continued)

*Primary Examiner* — Greg Binda
(74) *Attorney, Agent, or Firm* — United IP Counselors, LLC (57) ABSTRACT

A lock-up device includes an input rotary member into which the torque is inputted and an output rotary member rotatable relatively to the input rotary member in a predetermined torsion angular range. The output rotary member outputs the torque. The lock-up device also includes a plurality of first coil springs coupling the input rotary member and the output rotary member. The plurality of first coil springs are actuated in an entirety of the torsion angular range. The lock-up device further includes a plurality of second coil spring pairs or sets on either an outer peripheral side or an inner peripheral side of the plurality of first coil springs so as to be actuated in parallel to the plurality of first coil springs. The two or more coil springs have different magnitudes of stiffness and are actuated in series.

5 Claims, 4 Drawing Sheets

(58) Field of Classification Search
USPC ....... 464/67.1, 68.8; 192/3.29, 213.2–213.22
See application file for complete search history.

(56) References Cited

U.S. PATENT DOCUMENTS

| | | | | |
|---|---|---|---|---|
| 4,987,980 | A * | 1/1991 | Fujimoto | F16F 15/12346 192/213.2 |
| 2007/0051577 | A1 | 3/2007 | Avins | |
| 2011/0287844 | A1 | 11/2011 | Steinberger | |
| 2012/0208647 | A1 | 8/2012 | Takikawa et al. | |
| 2017/0152914 | A1 * | 6/2017 | Takikawa | F16H 45/02 |

FOREIGN PATENT DOCUMENTS

| | | | |
|---|---|---|---|
| CN | 103124866 A | 5/2013 | |
| CN | 103270343 A | 8/2013 | |
| CN | 105143722 A | 12/2015 | |
| CN | 106536991 A | 3/2017 | |
| DE | 1425218 B | 12/1971 | |
| DE | 112006002165 A5 | 5/2008 | |
| DE | 102011101156 A1 | 11/2011 | |
| EP | 1945968 A2 | 7/2008 | |
| ES | 290791 A1 | 1/1964 | |
| FR | 1366445 A | 7/1964 | |
| GB | 1047023 A | 11/1966 | |
| JP | 2009507194 A | 2/2009 | |
| JP | 2011252583 A | 12/2011 | |
| JP | 2014202328 A | 10/2014 | |
| JP | 2014224560 A | 12/2014 | |
| WO | 2007028366 A2 | 3/2007 | |
| WO | 2014167955 A1 | 10/2014 | |
| WO | 2014185148 A1 | 11/2014 | |

OTHER PUBLICATIONS

International Search Report dated Feb. 16, 2016 for corresponding foreign Application No. PCT/JP2015/082697, 2 pp.
Third Office Action of the corresponding Chinese patent application No. 201580072380.2, dated Sep. 20, 2019, 7 pp.

* cited by examiner

LOCK-UP DEVICE FOR TORQUE CONVERTER

CROSS-REFERENCE TO RELATED APPLICATIONS

This application is the U.S. National Phase of PCT International Application No. PCT/JP2015/082697, filed on Nov. 20, 2015. That application claims priority to Japanese Patent Application No. 2015-007593, filed Jan. 19, 2015. The contents of both applications are herein incorporated by reference in their entirety.

BACKGROUND

Technical Field

The present disclosure relates to a lock-up device, particularly to a lock-up device for a torque converter, which transmits a torque and also absorbs and attenuates torsional vibration.

Background Art

Torque converters are often equipped with a lock-up device that directly transmits a torque from a front cover to a turbine. The lock-up device includes a clutch part into which a torque is inputted from a front cover, an output member fixed to a turbine, and a damper part disposed between the clutch part and the output member. The damper part includes a plurality of torsion springs and couples an output-side member of the clutch part and the output member such that the output-side member and the output member are rotatable relatively to each other.

In this type of lock-up device, as described in Japan Laid-open Patent Application Publication No. 2011-252583, vibration can be effectively inhibited by lowering stiffness and widening torsion angle. Additionally, torsional characteristics are set to have three stages in order to achieve lowering of stiffness and widening of torsion angle in the torque characteristics and reliably obtain a predetermined torque transmission capacity.

BRIEF SUMMARY

In a lock-up device described in Japan Laid-open Patent Application Publication No. 2011-252583, two types of torsion springs, disposed on the outer peripheral side, are actuated in the first stage of the three-stage torsional characteristics, whereby a characteristic with low stiffness is realized. Thereafter, in one of the two types of outer peripheral side springs, windings of each outer peripheral side spring are closely contacted, and the first stage transitions to the second stage. In the second stage, the remaining springs of the two types of outer peripheral side springs are actuated. Next, in the third stage, one type of outer peripheral side springs and inner peripheral side springs are actuated, whereby a characteristic with high stiffness is realized.

As described above, in the device of Japan Laid-open Patent Application Publication No. 2011-252583, only the outer peripheral side springs are actuated in the first and second stages of the three-stage torsional characteristics, whereby the characteristic with low stiffness and a characteristic with medium stiffness are realized. Therefore, a load acting on the outer peripheral side springs becomes relatively high, and this makes it difficult to effectively inhibit vibration by lowering stiffness in characteristics as much as possible.

It is an object of the present disclosure to further effectively inhibit vibration in a lock-up device having multi-stage torsional characteristics by lowering stiffness and widening torsion angle as much as possible in the torsional characteristics.

A lock-up device for a torque converter according to an aspect of the present disclosure is a device configured to transmit a torque and absorb and attenuate torsional vibration, and includes an input rotary member, an output rotary member, a plurality of first coil springs and a plurality of second coil spring pairs or sets. The input rotary member is a component into which the torque is inputted. The output rotary member is disposed to be rotatable relatively to the input rotary member in a predetermined torsion angular range, and outputs the torque. The plurality of first coil springs couple the input rotary member and the output rotary member such that the input rotary member and the output rotary member are rotatable relatively to each other, and are actuated in entirety of the torsion angular range. The plurality of second coil spring pairs or sets are disposed on either an outer peripheral side or an inner peripheral side of the plurality of first coil springs so as to be actuated in parallel to the plurality of first coil springs. Each of the plurality of second coil spring pairs or sets includes two or more coil springs that have different magnitudes of stiffness and are actuated in series.

When this device is in a lock-up state, a torque inputted into the input rotary member is transmitted to the output rotary member through the plurality of first coil springs and the plurality of second coil spring pairs or sets, and is outputted therefrom.

Here, the plurality of first coil springs are actuated in the entirety of the torsion angular range, whereas the plurality of second coil spring pairs or sets are actuated in parallel to the plurality of first coil springs. Therefore, a load acting on each coil spring is more alleviated than that in a well-known device having multi-stage torsional characteristics. Therefore, lowering of stiffness and widening of torsion angle can be achieved as much as possible in torsional characteristics.

In a lock-up device for a torque converter according to another aspect of the present disclosure, the plurality of first coil springs are disposed on the inner peripheral side of the plurality of second coil spring pairs or sets, and are arc springs having a circular-arc shape in a free state.

Here, the plurality of first coil springs, actuated in entirety of the torsion angular range, are composed of arc springs. Hence, the spring length of each first coil spring can be elongated. Therefore, lowering of stiffness and widening of torsion angle become easy in torsional characteristics.

In a lock-up device for a torque converter according to another aspect of the present disclosure, the two or more coil springs in each of the plurality of second coil spring pairs or sets are arc springs having a circular-arc shape in a free state, and adjacent two of the two or more coil springs directly make contact with each other at circumferential end surfaces thereof.

Here, the plurality of second coil spring pairs or sets are composed of arc springs. Hence, similarly to the above, lowering of stiffness and widening of torsion angle can be achieved in torsional characteristics. Additionally, two coil springs, composing each of the plurality of second coil spring pairs or sets, are directly contacted to each other.

Hence, the spring length thereof can be elongated, and lowering of stiffness and widening of torsion angle become easy.

In a lock-up device for a torque converter according to yet another aspect of the present disclosure, the plurality of first coil springs and the plurality of second coil spring pairs or sets realize torsional characteristics having three stages, and each of the plurality of second coil spring pairs or sets includes a long spring, a medium spring and a short spring. The long spring has a longest circumferential length and a lowest magnitude of stiffness, and is actuated only in a first stage of the torsional characteristics. The medium spring has a shorter circumferential length than the long spring and a higher magnitude of stiffness than the long spring, and is actuated in the first stage and a second stage of the torsional characteristics. The short spring has a shorter circumferential length than the medium spring and a higher magnitude of stiffness than the medium spring, and is actuated in entirety of the torsional characteristics.

In a lock-up device for a torque converter according to yet another aspect of the present disclosure, each of the long spring and the medium spring is fully compressed in an order of the long spring and the medium spring when the input rotary member and the output rotary member are rotated relatively to each other.

According to the present disclosure described above, in a lock-up device having multi-stage torsional characteristics, lowering of stiffness and widening of torsion angle can be achieved as much as possible in torsional characteristics, whereby vibration can be further effectively inhibited.

DETAILED DESCRIPTION OF EMBODIMENTS

[Entire Configuration]

Figure 1:
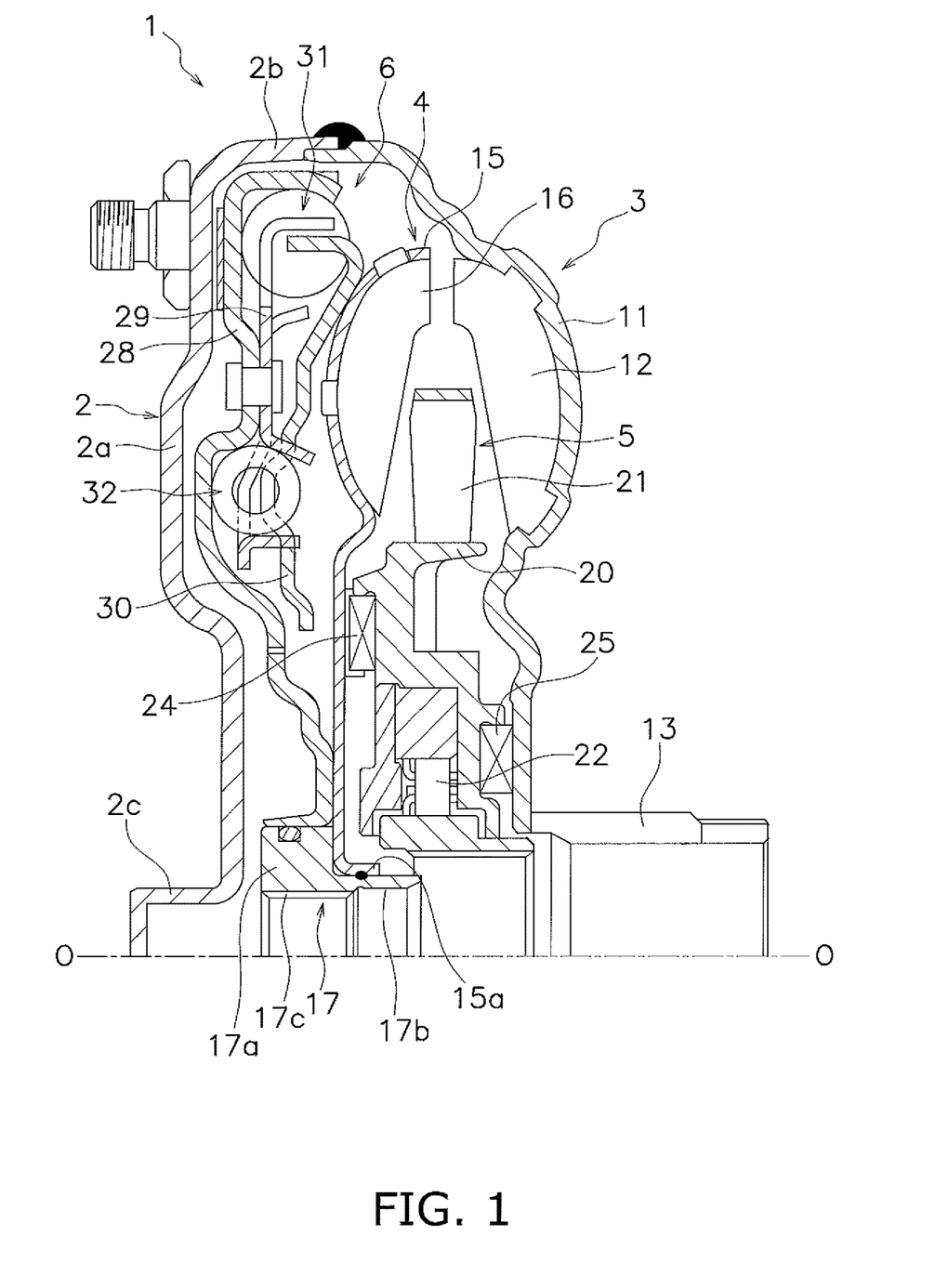
FIG. 1 is a schematic vertical cross-sectional view of a torque converter employing an exemplary embodiment of the present disclosure.

FIG. 1 is a schematic vertical cross-sectional view of a torque converter 1 including a lock-up device according to an exemplary embodiment of the present disclosure. The torque converter 1 is a device that transmits a torque from a crankshaft of an engine to an input shaft of a transmission. In FIG. 1, the engine (not shown in the drawing) is disposed on the left side, whereas the transmission (not shown in the drawing) is disposed on the right side. Line O-O depicted in FIG. 1 is a rotational axis of the torque converter 1.

The torque converter 1 includes a front cover 2, an impeller 3, a turbine 4, a stator 5 and a lock-up device 6. A fluid chamber having a torus shape is formed by the impeller 3, the turbine 4 and the stator 5.

The front cover 2 is a member into which a torque is inputted through a flexible plate (not shown in the drawings). The front cover 2 is a member disposed on the engine side and includes a body 2a having a disc shape and a tubular part 2b extending toward the transmission from the outer peripheral part of the body 2a. The front cover 2 includes a center boss 2c on the inner peripheral end thereof. The center boss 2c is a cylindrical member axially extending and is inserted into a center hole of the crankshaft (not shown in the drawings).

The impeller 3 is mainly composed of an impeller shell 11, a plurality of impeller blades 12 fixed to the inside of the impeller shell 11, and an impeller hub 13 fixed to the inner peripheral part of the impeller shell 11. The impeller shell 11 is disposed in opposition to the front cover 2 and is welded at the tip of the outer peripheral part thereof to the tubular part 2b of the front cover 2. The impeller hub 13 is a tubular member extending toward the transmission from the inner peripheral end of the impeller shell 11.

The turbine 4 is disposed axially in opposition to the impeller 3 within the fluid chamber. The turbine 4 mainly includes a turbine shell 15, a plurality of turbine blades 16 fixed to the inside of the turbine shell 15, and a turbine hub 17. The inner peripheral end of the turbine shell 15 is bent toward the transmission, whereby a fixation part 15a is formed.

The turbine hub 17 is a cylindrical member and includes a large diameter part 17a on the engine side and a small diameter part 17b on the transmission side. The small diameter part 17b has an outer diameter smaller than that of the large diameter part 17a. The large diameter part 17a includes a spline hole 17c on the inner peripheral surface thereof, and the input shaft of the transmission can be fitted to the spline hole 17c. Additionally, the fixation part 15a of the turbine shell 15 is welded to the outer peripheral surface of the small diameter part 17b.

The stator 5 is a mechanism that regulates the flow of hydraulic oil returning from the turbine 4 to the impeller 3. The stator 5 mainly includes a stator carrier 20 having an annular shape and a plurality of stator blades 21 provided on the outer peripheral surface of the stator carrier 20. The stator carrier 20 is supported by a stationary shaft having a tubular shape (not shown in the drawings) through a one-way clutch 22.

It should be noted that a thrust bearing 24 is disposed between the turbine shell 15 and the stator carrier 20, whereas a thrust bearing 25 is disposed between the stator carrier 20 and the impeller shell 11.

[Lock-Up Device 6]

The lock-up device 6 is a device that transmits a torque inputted into the front cover 2 to the transmission and also absorbs and attenuates torsional vibration. As shown in FIG. 1, the lock-up device 6 is disposed between the front cover 2 and the turbine 4 and mechanically couples both at a predetermined rotational speed or greater.

Figure 2:
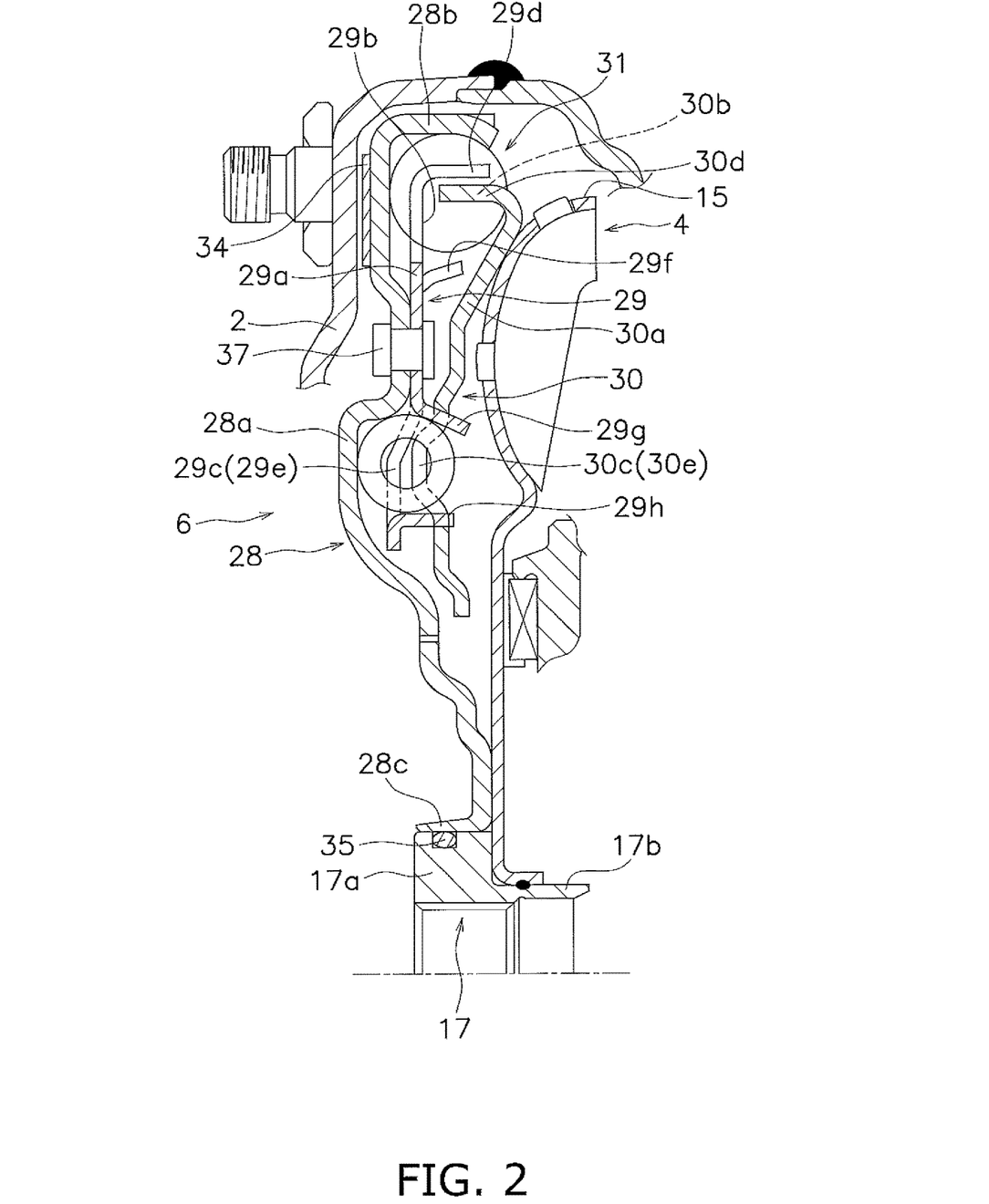
FIG. 2 is a diagram showing a lock-up device extracted from FIG. 1.

As shown in FIGS. 1 and 2, the lock-up device 6 includes a piston 28, a drive plate 29 as an input rotary member, a driven plate 30 as an output rotary member, outer peripheral side damper parts 31 and inner peripheral side damper parts 32. It should be noted that FIG. 2 shows the lock-up device 6-related components extracted from FIG. 1.

<Piston 28>

The piston 28 is a disc-shaped plate member that is disposed in opposition to the front cover 2 and is axially movable by the action of hydraulic pressure. As shown in FIG. 2, the piston 28 includes a disc part 28a, an outer peripheral tubular part 28b and an inner peripheral tubular part 28c.

A friction member 34 is fixed to a surface opposed to the front cover 2 on the outer peripheral part of the disc part 28a. When the friction member 34 is pressed onto a lateral surface of the front cover 2, a torque inputted into the front cover 2 is transmitted to the output side through the piston 28. The outer peripheral tubular part 28b is a part formed by bending the outer peripheral part of the disc part 28*a* toward the transmission. On the other hand, the inner peripheral tubular part 28*c* is a part formed by bending the inner peripheral part of the disc part 28*a* toward the engine, and is supported by the outer peripheral surface of the large diameter part 17*a* of the turbine hub 17 so as to be capable of sliding thereon.

It should be noted that a seal member 35 is provided on the outer peripheral surface of the large diameter part 17*a* of the turbine hub 17, and seals between the large diameter part 17*a* of the turbine hub 17 and the inner peripheral tubular part 28*c* of the piston 28.

<Drive Plate 29>

Figure 3:
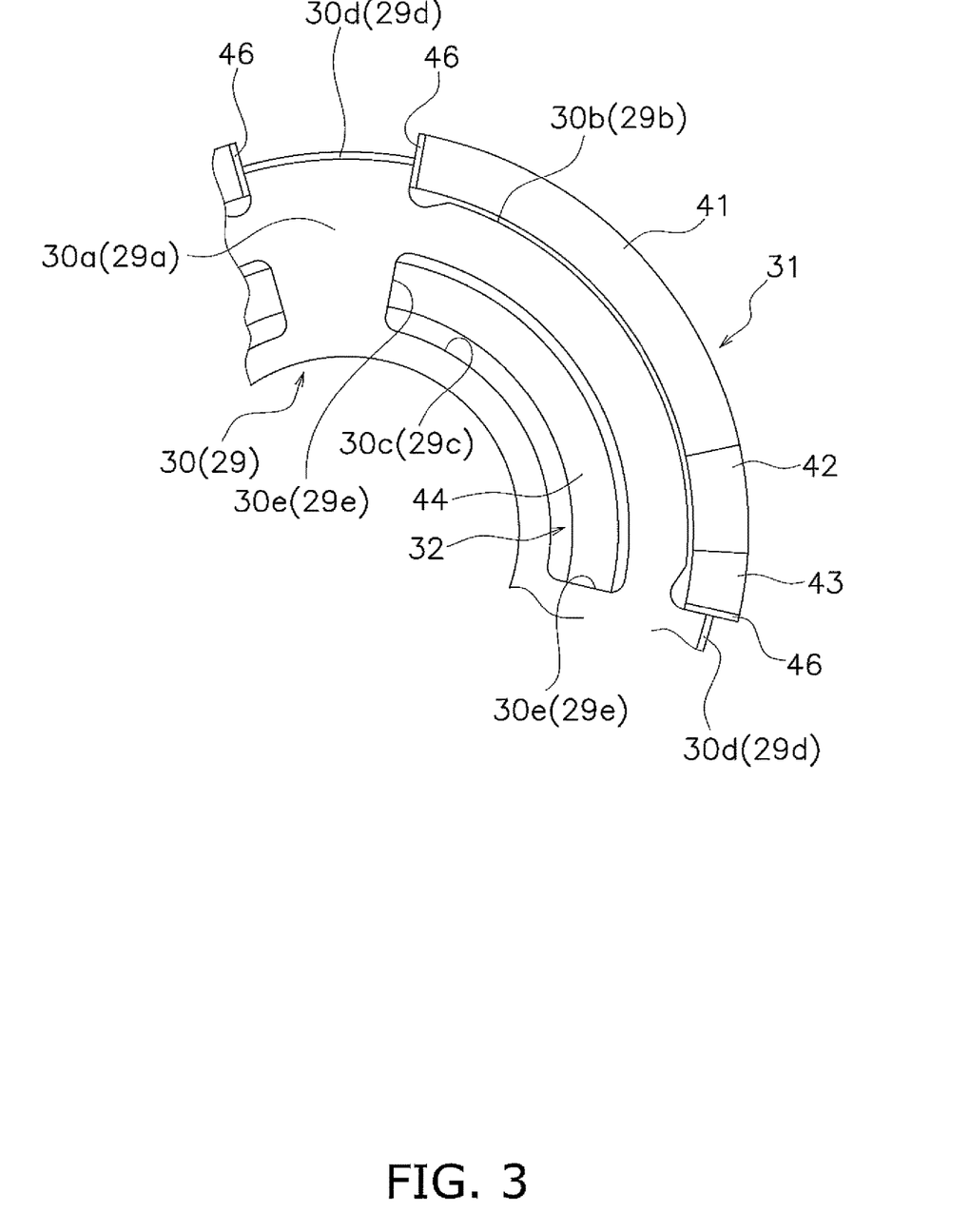
FIG. 3 is a view of a driven plate and outer peripheral side and inner peripheral side damper part in FIG. 1 as seen from an engine side.

The drive plate 29 is a disc-shaped plate member that is disposed between the piston 28 and the turbine 4. As shown in FIGS. 2 and 3, the drive plate 29 includes a fixation part 29*a* fixed to the disc part 28*a* of the piston 28 by a rivet(s) 37, input-side outer peripheral accommodation parts 29*b*, input side inner peripheral accommodation parts 29*c*, input side first engaging parts 29*d*, and input side second engaging parts 29*e*.

It should be noted that FIG. 3 is a view of the driven plate 30, the outer peripheral side and inner peripheral side damper parts 31 and 32 as seen from the engine side. The basic configurations of the drive plate 29 and the driven plate 30 are the same, although the specific shapes thereof are different from each other. Hence, explanation will be made by assigning reference signs to parts related to both plates 29 and 30 in FIG. 3.

The input side outer peripheral accommodation parts 29*b* are parts formed by cutting out the outer peripheral part of the fixation part 29*a* and are provided at predetermined intervals in the circumferential direction. Each outer peripheral side damper part 31 is accommodated in each input side outer peripheral accommodation part 29*b*. As shown in FIG. 2, the inner peripheral edge of each input side outer peripheral accommodation part 29*b* is cut and raised toward the transmission, whereby an inner peripheral support part 29*f* is formed.

The input side inner peripheral accommodation parts 29*c* are openings provided on the inner peripheral side of the input side outer peripheral accommodation parts 29*b*. Each inner peripheral side damper part 32 is accommodated in each input side inner peripheral accommodation part 29*c*. As shown in FIG. 2, the outer peripheral edge and the inner peripheral edge of each input side inner peripheral accommodation part 29*c* are cut and raised toward the transmission, whereby an outer peripheral support part 29*g* and an inner peripheral support part 29*h* are formed. It should be noted that each of the outer peripheral support part 29*g* and the inner peripheral support part 29*h* is provided only partially on a circumferential middle part of the outer/inner peripheral edge of each input side inner peripheral accommodation part 29*c* without being provided on the circumferential entirety of the outer/inner peripheral edge of each input side inner peripheral accommodation part 29*c*.

Each input side first engaging part 29*d* is disposed between adjacent input side outer peripheral accommodation parts 29*b*. The input side first engaging parts 29*d* are formed by bending part of the outer peripheral part of the drive plate 29, in which the input side outer peripheral accommodation parts 29*b* are not provided, toward the transmission. On the other hand, both circumferential ends of each input side inner peripheral accommodation part 29*c* are provided as the input side second engaging parts 29*e*.

<Driven Plate 30>

The driven plate 30 is a disc-shaped plate member that is disposed between the drive plate 29 and the turbine 4. The driven plate 30 includes a fixation part 30*a* welded at the outer peripheral part thereof to the turbine shell 15, output side outer peripheral accommodation parts 30*b*, output side inner peripheral accommodation parts 30*c*, output side first engaging parts 30*d* and output side second engaging parts 30*e*.

The output side outer peripheral accommodation parts 30*b* are provided in opposed positions to the input side outer peripheral accommodation parts 29*b* of the drive plate 29. Additionally, the output side outer peripheral accommodation parts 30*b* also have the same configuration as the input side outer peripheral accommodation parts 29*b* of the drive plate 29, and are formed by cutting out the outer peripheral part of the fixation part 30*a*. Each outer peripheral side damper part 31 is accommodated in each output side outer peripheral accommodation part 30*b*.

The output side inner peripheral accommodation parts 30*c* are openings provided on the inner peripheral side of the output side outer peripheral accommodation parts 30*b*. The output side inner peripheral accommodation parts 30*c* are provided in opposed positions to the input side inner peripheral accommodation parts 29*c*, and each has the same circumferential length as each input side inner peripheral accommodation part 29*c*. Each inner peripheral side damper part 32 is accommodated in each output side inner peripheral accommodation part 30*c*.

Each outer peripheral support part 29*g* and each inner peripheral support part 29*h* of the drive plate 29 are inputted into each output side inner peripheral accommodation part 30*c*. As described above, the outer peripheral support part 29*g* and the inner peripheral support part 29*h* are provided only partially on each input side inner peripheral accommodation part 29*c*. Hence, gaps are produced between the end surfaces of each output side inner peripheral accommodation part 30*c* and both circumferential ends of each of the outer peripheral support part 29*g* and the inner peripheral support part 29*h*. Relative rotation is enabled between the drive plate 29 and the driven plate 30 by an angle corresponding to the gaps. In other words, a stopper mechanism, restricting relative rotation between the drive plate 29 and the driven plate 30 to a predetermined angle, is composed of each outer peripheral support part 29*g* and each inner peripheral support part 29*h* of the drive plate 29 and each output side inner peripheral accommodation part 30*c* of the driven plate 30.

Each output side first engaging part 30*d* is disposed between adjacent output side outer peripheral accommodation parts 30*b*. The output side first engaging parts 30*d* are formed by bending part of the outer peripheral part of the driven plate 30, in which the output side outer peripheral accommodation parts 30*b* are not provided, toward the engine. On the other hand, both circumferential ends of each output side inner peripheral accommodation part 30*c* are provided as the output side second engaging parts 30*e*.

<Outer Peripheral Side Damper Parts 31>

The outer peripheral side damper parts 31 are disposed in three positions at angular intervals of 120 degrees. Each outer peripheral side damper part 31 includes a first torsion spring 41, a second torsion spring 42 and a third torsion spring 43. The first to third torsion springs 41, 42 and 43 are arc springs, each of which has a circular-arc shape in a free state, in other words, in a pre-assembled state. As described above, each outer peripheral side damper part 31 is held by each input side outer peripheral accommodation part 29*b* and each output side outer peripheral accommodation part 30*b*. Additionally, the respective torsion springs 41, 42 and 43 are supported by the outer peripheral tubular part 28b of the piston 28 from the outer peripheral side, while being supported by each inner peripheral support part 29f of the drive plate 29 from the inner peripheral side.

The first torsion spring 41 has a first length in the circumferential direction and has a first stiffness. The second torsion spring 42 has a second length shorter than the first length in the circumferential direction, and has a second stiffness higher than the first stiffness. The third torsion spring 43 has a third length shorter than the second length in the circumferential direction, and has a third stiffness higher than the second stiffness. In other words, a relation of "the first torsion spring 41>the second torsion spring 42>the third torsion spring 43" is established regarding the magnitude of circumferential length, whereas a relation of "the first torsion spring 41<the second torsion spring 42<the third torsion spring 43" is established regarding the magnitude of stiffness.

Each of one end of the first torsion spring 41 and the other end of the third torsion spring 43 makes contact with each input side first engaging part 29d and each output side first engaging part 30d through a spring seat 46. Both ends of the second torsion spring 42 directly make contact with the other end of the first torsion spring 41 and one end of the third torsion spring 43. Accordingly, the first to third torsion springs 41 to 43 are configured to be actuated in series.

<Inner Peripheral Side Damper Parts 32>

The inner peripheral side damper parts 32 are disposed on the inner peripheral side of the outer peripheral side damper parts 31, and similarly to the outer peripheral side damper parts 31, are disposed in three positions at angular intervals of 120 degrees. Each inner peripheral side damper part 32 is composed of one fourth torsion spring 44. The fourth torsion spring 44 is an arc spring that has a circular-arc shape in a free state, in other words, in a pre-assembled state. As described above, the fourth torsion spring 44 is held by each input side inner peripheral accommodation part 29c and each output side inner peripheral accommodation part 30c. Additionally, the fourth torsion spring 44 is radially supported by each outer peripheral support part 29g and each inner peripheral support part 29h of the drive plate 29.

The fourth torsion spring 44 is engaged at both ends thereof with pairs of the input side second engaging part 29e of the drive plate 29 and the output side second engaging part 30e of the driven plate 30. Accordingly, the respective sets of first to third torsion springs 41 to 43 and the fourth torsion springs 44 are configured to be actuated in parallel.

[Actions]

When the rotational speed of the engine is low, the piston 28 is moved toward the transmission by the action of hydraulic oil, and the friction member 34 is separated from the front cover 2. In other words, a lock-up clutch is being turned off. In such a state, a torque inputted into the front cover 2 is transmitted to the input shaft of the transmission through the impeller 3 and the turbine 4.

On the other hand, when the engine rotational speed becomes a predetermined rotational speed or greater, the piston 28 is moved toward the front cover 2 by the action of hydraulic oil. Accordingly, the friction member 34 is pressed onto the front cover 2, whereby the lock-up clutch is turned on. In such a state, the torque inputted into the front cover 2 is transmitted through the path of "the piston 28→the drive plate 29→the outer peripheral side damper parts 31 and the inner peripheral side damper parts 32→the driven plate 30→the turbine 4", and is outputted to the input shaft of the transmission.

Figure 4:
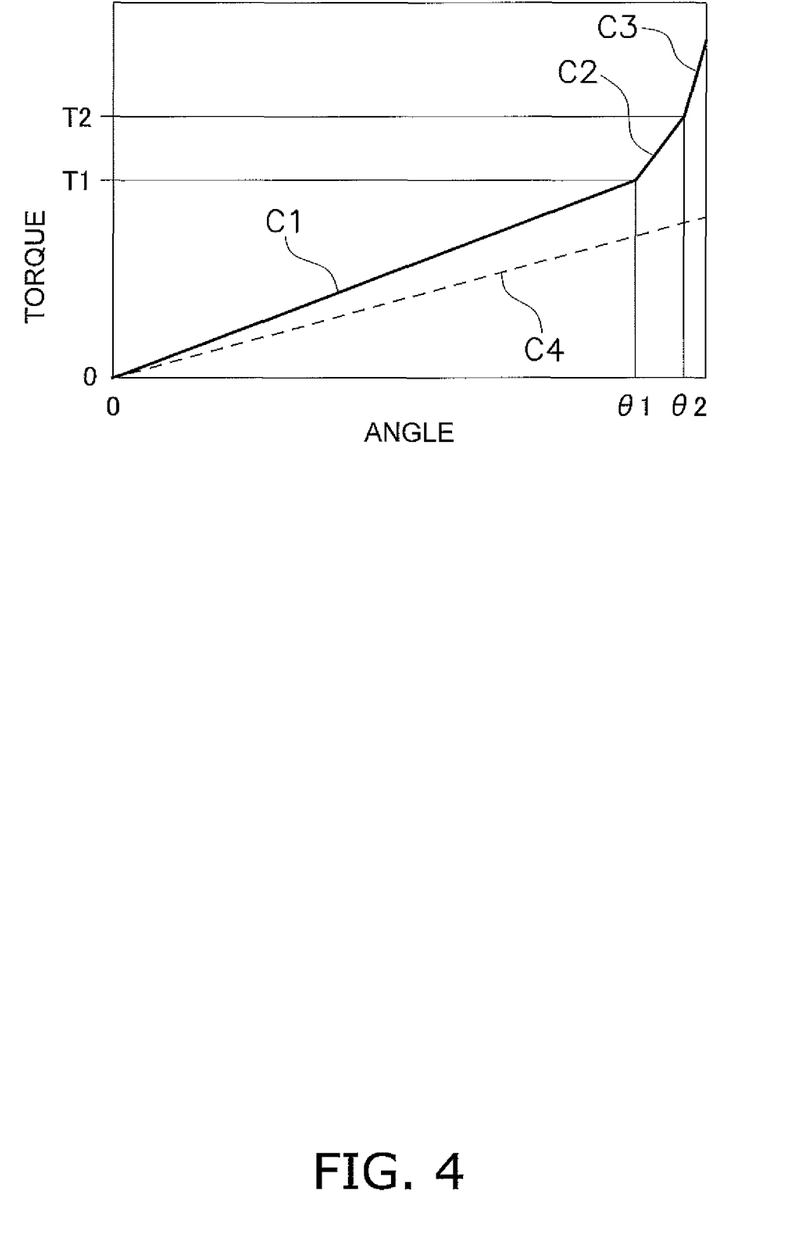
FIG. 4 is a diagram showing three-stage torsional characteristics of the lock-up device.

In the aforementioned state that the lock-up clutch is being turned on, the lock-up device 6 transmits a torque, and based on three-stage torsional characteristics shown in FIG. 4, absorbs and attenuates torsional vibration inputted thereto from the front cover 2 by the outer peripheral side and inner peripheral side damper parts 31 and 32.

Specifically, when a torque to be inputted is in a range of 0 to T1, the drive plate 29 and the driven plate 30 are rotated relatively to each other in an angular range of 0 to θ1, and the first to third torsion springs 41 to 43 of the outer peripheral side damper parts 31 and the fourth torsion springs 44 of the inner peripheral side damper part 32 are actuated. In more detail, each set of the first to third torsion springs 41 to 43 is actuated in series, while the respective sets of first to third torsion springs 41 to 43 and the fourth torsion springs 44 are actuated in parallel. A torsional characteristic exerted in this case is a first stage characteristic C1 with the lowest stiffness.

When the torque to be inputted exceeds T1 and the relative rotational angle (i.e., torsion angle) between the drive plate 29 and the driven plate 30 becomes θ1 or greater, windings of each first torsion spring 41 are closely contacted to each other. Therefore, when the torque to be inputted is in a range of T1 to T2 (when the torsion angle is in a range of θ1 to θ2), the respective pairs of second and third torsion springs 42 and 43 and the fourth torsion springs 44 are actuated. In more detail, each pair of the second and third torsion springs 42 and 43 is actuated in series, while the respective pairs of second and third torsion springs 42 and 43 and the fourth torsion springs 44 are actuated in parallel. A torsional characteristic exerted in this case is a second stage characteristic C2 with a medium stiffness higher than the stiffness of the first stage characteristic C1.

When the torque to be inputted further increases and exceeds T2, in other words, when the torsion angle becomes θ2 or greater, not only the windings of each first torsion spring 41 but also those of each second torsion spring 42 are closely contacted to each other. Due to this, when the torque to be inputted is in a range of T2 or greater (when the torsion angle is in a range of θ2 or greater), the third torsion springs 43 and the fourth torsion springs 44 are actuated in parallel. A torsional characteristic exerted in this case is a third stage characteristic C3 with a high stiffness further higher than the stiffness of the second stage characteristic C2.

It should be noted that a characteristic C4 depicted with a broken line in FIG. 4 is a torsional characteristic exerted in actuation of only the fourth torsion springs 44.

[Feature]

(1) In the first stage characteristic C1, four types of torsion springs 41 to 44 are actuated, whereas in the second stage characteristic C2, three types of torsion springs 42 to 44 are actuated. On the other hand, in the third stage characteristic C3, two types of torsion springs 43 and 44 are actuated. Due to this, a load acting on each of the torsion springs 42 to 44 is more alleviated than that in a well-known lock-up device having three-stage torsional characteristics. Therefore, lowering of stiffness can be achieved as much as possible in the torsional characteristics, and widening of torsion angle can be also achieved in a low stiffness part in the torsional characteristics, whereby vibration can be attenuated as effectively as possible.

(2) In each outer peripheral side damper part 31, three torsion springs 41 to 43 are directly contacted to each other. Hence, torsion angle can be more widened than in a construction that spring seats are disposed among the respective torsion springs.

(3) In each outer peripheral side damper part 31, all the three torsion springs 41 to 43 are composed of arc springs. Hence, the respective torsion springs 41 to 43 smoothly make contact with each other at the end surfaces thereof, whereby behaviors of the respective torsion springs 41 to 43 are stabilized.

(4) The torsion springs 41 to 44 are composed of arc springs. Hence, the spring length of each first torsion spring 41 and that of each fourth torsion spring 44 can be elongated in particular, and this advantageously works for lowering of stiffness and widening of torsion angle.

(5) Three torsion springs 41 to 43, composing each outer peripheral side damper part 31, are supported by the outer peripheral tubular part 28b of the piston 28 and each inner peripheral support part 29f of the drive plate 29. In other words, the torsion springs 41 to 43 are supported by different members. Therefore, it becomes easy to regulate a hysteresis torque to be generated between the torsion springs 41 to 43 and both of the outer peripheral tubular part 28b and each support part 29f, whereby it is possible to cope with vibration reduction in a wider range of vehicle specifications.

OTHER EXEMPLARY EMBODIMENTS

The present disclosure is not limited to the exemplary embodiment described above, and a variety of changes or modifications can be made without departing from the scope of the present disclosure.

(a) In the aforementioned exemplary embodiment, the lock-up device 6 has been exemplified as having three-stage torsional characteristics. However, the number of stages of the torsional characteristics is not limited to three, and the present disclosure is applicable as long as the number of torsional characteristics is plural.

(b) Settings of stiffness and spring length for four types of torsion springs 41 to 44 are not limited to those in the aforementioned exemplary embodiment, and a variety of changes can be made for them.

INDUSTRIAL APPLICABILITY

In the lock-up device of the present disclosure, when multi-stage torsional characteristics are realized, lowering of stiffness and widening of torsion angle can be achieved as much as possible in the torsional characteristics, whereby vibration can be further effectively inhibited.

REFERENCE SIGNS LIST

1 Torque converter
6 Lock-up device
29 Drive plate (input rotary member)
30 Driven plate (output rotary member)
31 Outer peripheral side damper part (second coil spring pair or set)
32 Inner peripheral side damper part (first coil spring)
41 to 43 First to third torsion springs (second coil spring pair or set)
44 Fourth torsion spring (first coil spring)

The invention claimed is:

1. A lock-up device for a torque converter, the lock-up device configured to transmit a torque and absorb and attenuate torsional vibration, the lock-up device comprising:
   an input rotary member into which the torque is inputted;
   an output rotary member rotatable relative to the input rotary member in a predetermined torsion angular range, the output rotary member for outputting the torque;
   a plurality of first coil springs coupling the input rotary member and the output rotary member such that the input rotary member and the output rotary member are rotatable relative to each other, the plurality of first coil springs to be actuated in an entirety of the torsion angular range; and
   a plurality of second coil spring pairs or sets on either an outer peripheral side or an inner peripheral side of the plurality of first coil springs so as to be actuated in parallel to the plurality of first coil springs, each of the plurality of second coil spring pairs or sets including two or more coil springs, the two or more coil springs having different magnitudes of stiffness, the two or more coil springs actuated in series, adjacent two or more springs of the plurality of second coil spring pairs or sets directly contacting each other at circumferential end surfaces thereof.

2. The lock-up device according to claim 1, wherein the plurality of first coil springs are on an inner peripheral side of the plurality of second coil spring pairs or sets, the plurality of first coil springs being arc springs having a circular-arc shape in a free state.

3. The lock-up device according to claim 1, wherein the two or more coil springs in each of the plurality of second coil spring pairs or sets are arc springs having a circular-arc shape in a free state.

4. The lock-up device according to claim 1, wherein
   the plurality of first coil springs and the plurality of second coil spring pairs or sets realize torsional characteristics having three stages,
   each of the plurality of second coil spring pairs or sets includes a long spring, a medium spring and a short spring,
   the long spring has a longest circumferential length and a lowest magnitude of stiffness, the long spring actuated only in a first stage of the torsional characteristics,
   the medium spring has a shorter circumferential length than the long spring and a higher magnitude of stiffness than the long spring, the medium spring actuated in the first stage and a second stage of the torsional characteristics, and
   the short spring has a shorter circumferential length than the medium spring and a higher magnitude of stiffness than the medium spring, the short spring actuated in an entirety of the torsional characteristics.

5. The lock-up device according to claim 4, wherein each of the long spring and the medium spring is fully compressed in an order of the long spring and the medium spring when the input rotary member and the output rotary member are rotated relative to each other.

* * * * *